May 14, 1963 R. O. ROBINSON, JR 3,089,421

TOROIDAL COIL INFLUENCE OSCILLATOR

Filed Oct. 27, 1955

INVENTOR.
RALPH O. ROBINSON, JR.
BY R. W. O'Brien
W. O. Quesenberry
ATTORNEYS 3,089,421

TOROIDAL COIL INFLUENCE OSCILLATOR

Ralph O. Robinson, Jr., Silver Spring, Md., assignor to the United States of America as represented by the Secretary of the Navy Filed Oct. 27, 1955, Ser. No. 543,285
1 Claim. (Cl. 102—70.2)

The present invention relates in general to an oscillator circuit that includes a toroidally wound inductance element, and more particularly to a radio frequency reaction oscillator that includes a toroidal inductance whereby such oscillator circuit may be made extremely small and compact. This application is a continuation-in-part of U.S. patent application Serial No. 266,948, filed January 17, 1952, for "Toroidal Coil Influence Oscillator," by the applicant and now abandoned.

In order to accommodate an oscillator in a proximity fuze, it is highly desirable that the oscillator be made as compact and tiny as possible because of the limited space available. However, the inductance that constitutes an essential part of such oscillator cannot be located too close to other circuit elements, because of inductive and capacitive disturbances that would result from such crowding and would reduce the "Q" of the coil and decrease the reaction sensitivity of the oscillator.

In accordance with the present invention these difficulties are eliminated by using a toroidally-wound coil as the inductance. As a toroid has practically no external magnetic field, it becomes possible to place certain other circuit components in close proximity to the coil. For example, the oscillator tube itself may be placed even within the central hole of the toroid, without adversely affecting the performance of the oscillator.

It is, therefore, an object of the invention to provide a reaction or influence oscillator circuit that includes a toroidal inductance.

Another object is to provide a very small and compact oscillator circuit.

A further object is to provide an efficient oscillator circuit suitable for use in proximity fuzes for projectiles and the like.

An additional object is to provide a small and very compact oscillator circuit that may be embedded in potting compound or molded into a suitable plastic material without detriment to the "Q" and efficiency of the oscillator.

Other objects and many of the attendant advantages of this invention will be appreciated readily as the same becomes understood by reference to the following detailed description, when considered in connection with the accompanying drawings, wherein.

Figures 1, 2:
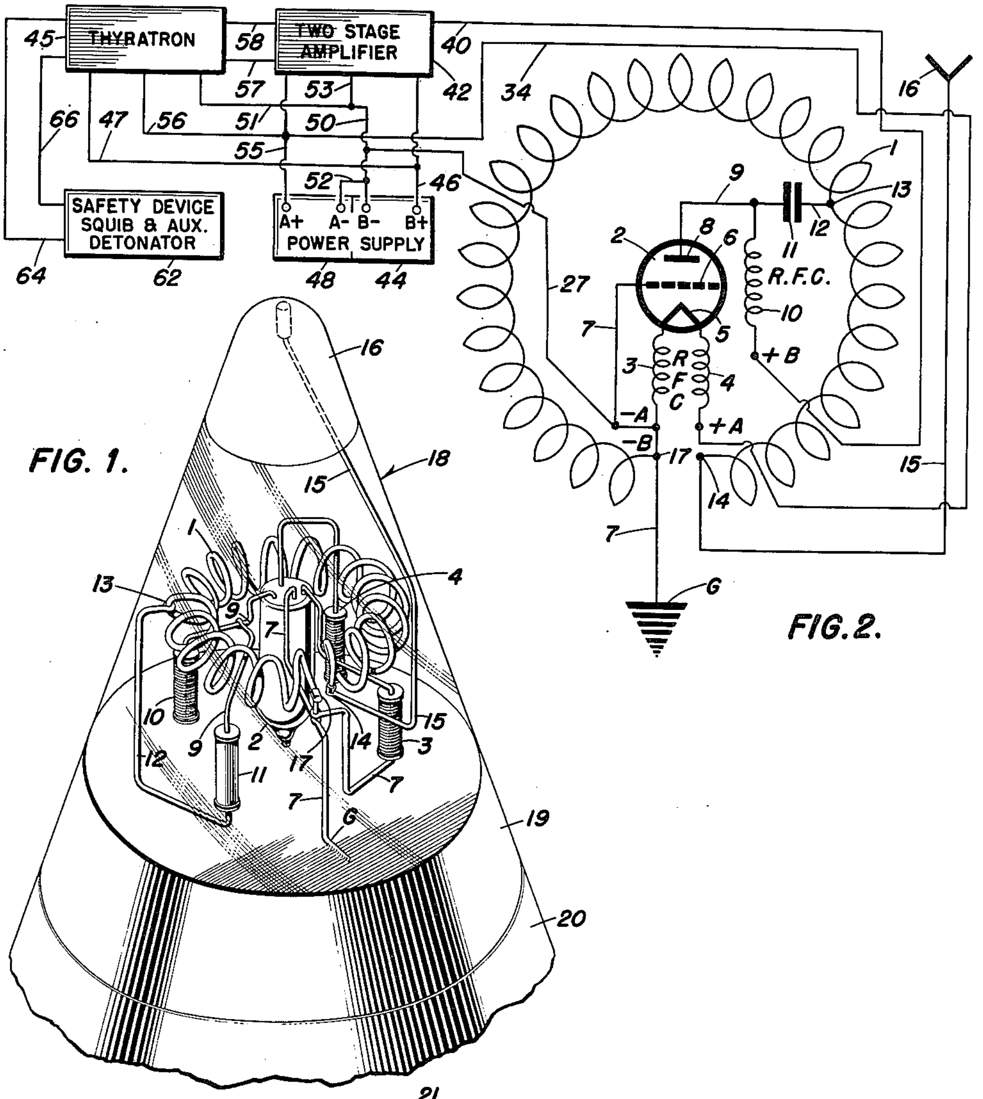
FIG. 1 is a perspective view, showing the invention mounted in the nose of a fuze.
FIG. 2 is a circuit diagram.

Referring first to FIG. 2, there is shown an oscillator of the Colpitts type, employing a toroidally wound helix as the inductance or coil 1. A tube 2, here shown as a triode, is connected to the coil 1 as shown, namely, one end 17 of coil 1 is connected to conductor 7 which leads to the grid 6 of the triode tube 2. This conductor 7 also is connected to the common negative terminals of the "A" and "B" batteries 48 and 44, respectively, by means of conductors 27, 50, and 52 and to the ground G, in the conventional way.

The filament 5 of the triode tube 2 is connected to the —A terminal of battery 48 through a radio frequency choke coil 3 and to the +A terminal of battery 48 by means of conductors 34 and 55 through a companion choke coil 4, to obtain its heating current. The anode 8 of the triode tube 2 is connected through conductor 9, a capacitor 11 and a conductor 12 to a suitably located tap 13 of coil 1. Anode 8 is suitably energized through conductors 9, 40 and 46, and a radio frequency choke coil 10 from the positive terminal +B of the B-battery 44 or other source of electricity. The capacitor 11 serves as a stopping capacitor to prevent short-circuiting the B-battery 44 while freely passing the high frequency oscillations generated by the triode tube 2. An antenna 16 is connected to the ungrounded end 14 of the helix coil 1 through the conductor 15. The triode tube 2, which is usually of subminiature type, may be located within the central opening of the helix coil 1 as shown best in FIG. 1, and such opening need only be large enough to admit the triode tube 2 freely.

Anode 8 of triode tube 2 is connected to a two-stage amplifier 42 by means of conductor 40. Amplifier 42 is located within the fuze. Batteries 44 and 48 supply power to amplifier 42. The +B terminal of battery 44 is connected to the amplifier 42 and to a thyratron 45 by conductors 46 and 47. The —B terminal of battery 44, on the other hand, is connected to the amplifier 42 and thyratron 45 by conductors 50, 51 and 53. The —B terminal of the battery 44 and the —A terminal of battery 48 are connected together by conductor 52. The +A terminal of battery 48 is connected to amplifier 42 and thyratron 45 by conductors 55 and 56. The output of amplifier 42 is connected to the input of thyratron 45 by conductors 57 and 58. A safety unit 62, including a firing squib and an auxiliary detonator, is connected by conductors 64 and 66 to the output of thyratron 45. The reserve batteries 48 and 44, as well as the two-stage amplifier 42, the thyratron 45, and the safety unit 62, are conventional and are described more fully in Electronics, volume 19, 1946, in an article entitled, "Proximity Fuzes for Artillery," pp. 104–109.

The toroidal coil 1 may be made by first winding a helix of wire on a straight form and then bringing the two ends of the helix near each other, upon bending the helix into toroidal shape. The form used in making the helix may be removed before curving the helix into toroidal shape, or if preferred it may be left in place permanently, in which event it should, of course, be made of a suitable low-loss dielectric material, such as polyethylene or polystyrene, for example.

Figure 3:
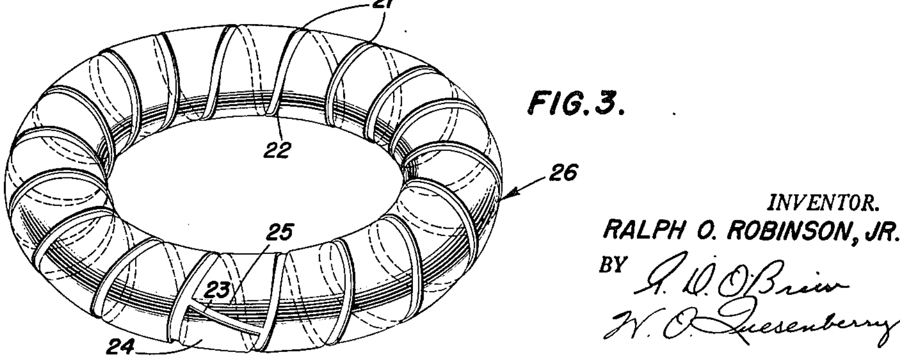
FIG. 3 is a perspective view showing an alternative form of toroidal winding that may be used as the inductance of the oscillator.

It is also possible to produce the toroidal winding in an entirely different way. This is illustrated in FIG. 3. Here a torus 26 made of a suitable dielectric material, for example polystyrene, is first provided. The entire surface of this torus is then coated with a conducting layer 21 of metal, which may be done in any preferred way, as by electroplating or by cathode deposition or evaporation in a vacuum, whereupon a helical line 22 may be etched or otherwise cut completely through the conducting layer as shown. A transverse cut is made as indicated at 23, thereby providing two terminals 24 and 25 for the helix now formed by the coating. These terminals correspond to the terminals 14 and 17 of the wire-wound toroidal coil 1 shown in FIG. 1. The intermediate tap (not shown) corresponding to 13 of FIG. 1 may be made at any suitable point along the coating 21. The dividing cut between the convolutions of the coating may be relatively narrow, but is shown exaggerated in width in the drawing. Narrowness of this cut is advantageous in decreasing magnetic leakage from the winding.

This form of toroidal winding has the advantage over wire-wound types that even the very small possibility of magnetic flux-leakage of the wire-wound toroid is still further reduced to practically zero. With either type of winding the entire circuit, including the electronic triode tube 2, choke coils 3, 4, and 10, capacitor 11 and toroidal coil 1 may be embedded completely in the usual potting compound without detriment to the efficiency and "Q" of the oscillator.

Reference to FIG. 1 demonstrates how the circuit components may be mounted compactly in a conical nose or tip 18 of the conventional fuze. The triode tube 2 is placed axially of the nose 18, preferably tip down, so that the lead-in wires are accessible above to simplify and shorten the connections between the wires and the other components of the circuit. The coil 1 surrounds the oscillator triode tube 2, and the choke coils 3, 4, and 10, and the capacitor 11 are optionally located in conventional suitably placed bores formed in the lower or base portion of the nose 18. The antenna 16 is shown as a metal cap at the tip of said nose 18. A metal fitting 19 provides a base for the fuze nose 18, and secures it to a projectile 20, which also constitutes the ground.

The structure may be manufactured either by previously molding the nose 18 of suitable plastic material, with all the necessary cavities ready-formed therein, or by molding the plastic in situ over the previously assembled and properly electrically connected circuit components whereby the entire structure becomes a rigid unit.

While the invention has been described with a triode tube 2 as the oscillator tube, it is obvious that this has been done purely by way of illustration, and no limitation to triode tubes is to be presumed therefrom.

In operational use, a proximity fuze having mounted therein the toroidal coil influence oscillator and associated circuitry, is mounted in a projectile and fired from a suitable weapon. After the batteries 48 and 44 have been activated by suitable means, the oscillator arrangement described so far oscillates at the desired frequency. The signal therefrom is radiated by the antenna 16 into space and is reflected back by means of a suitable target. This reflected signal is again picked up by the antenna 16 and is fed to the oscillator tube 2 and hence to the amplifier 42 where it is amplified and then fed to the thyratron or firing tube 45. The output from the thyratron tube 45 is used to fire a firing condenser (not shown), which, in turn, sets off the firing squib and auxiliary detonator and subsequently an explosive charge which is contained in the projectile.

The toroidal coil 1 is practically insensitive to the environment outside its field, thus permitting the oscillator arrangement to be shortened by a considerable amount by placing the oscillator triode 2 through the center of the toroidal coil 1. This circuit has the advantage that the near field of the oscillator toroidal coil 1 is self-contained, thus minimizing near field, loss-loading effects.

Obviously many modifications and variations of the present invention are possible in the light of the above teachings. It is therefore to be understood that within the scope of the appended claim, the invention may be practiced otherwised than as specifically described.

What is claimed is:

In combination with a proximity fuze for projectiles, said fuze having a nose portion, and means responsive to a signal for detonating said fuze; an oscillator arrangement for generating electromagnetic radiation and detecting reflections of said radiation to produce said signal, comprising, an electron tube mounted within said nose portion along the axis of symmetry thereof, a resonant circuit including a toroidal inductance coil, circuit connections between said electron tube and said resonant circuit to cause sustained oscillating currents to flow within said coil, said coil being mounted in a plane transverse to the axis of said nose portion and surrounding said electron tube, said coil also having its centerline coincident with the axis of said nose portion, means for radiating energy from said coil and receiving reflections of said energy, and means for embedding said arrangement in said projectile nose portion.

References Cited in the file of this patent

UNITED STATES PATENTS

| | | |
|---|---|---|
| 1,752,196 | Patrie | Mar. 25, 1930 |
| 2,149,387 | Brown | Mar. 7, 1939 |
| 2,509,903 | Brode | May 30, 1950 |

OTHER REFERENCES

"Proximity Fuzes for Artillery," "Electronics," vol. 19, February 1946, pp. 104–109; Selvidge.